(12) United States Patent
Clarke

(10) Patent No.: US 6,896,864 B2
(45) Date of Patent: May 24, 2005

(54) SPATIAL LOCALIZATION OF DISPERSED SINGLE WALLED CARBON NANOTUBES INTO USEFUL STRUCTURES

(75) Inventor: Mark S. F. Clarke, Seabrook, TX (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 09/983,830

(22) Filed: Oct. 26, 2001

(65) Prior Publication Data

US 2003/0012723 A1 Jan. 16, 2003

Related U.S. Application Data

(60) Provisional application No. 60/303,815, filed on Jul. 10, 2001.

(51) Int. Cl.[7] ................................................. D01F 9/12
(52) U.S. Cl. ............................... 423/447.1; 423/447.2; 423/445 R; 428/367
(58) Field of Search ......................... 423/447.1, 447.2, 423/445 R, 461; 428/367

(56) References Cited

U.S. PATENT DOCUMENTS

| | | | |
|---|---|---|---|
| 5,560,898 A | 10/1996 | Uchida et al. | |
| 5,904,852 A | 5/1999 | Tour et al. | |
| 6,187,823 B1 | 2/2001 | Haddon et al. | |
| 6,331,262 B1 | 12/2001 | Haddon et al. | |
| 6,350,488 B1 | 2/2002 | Lee et al. | |
| 6,368,569 B1 | 4/2002 | Haddon et al. | |
| 6,465,132 B1 * | 10/2002 | Jin ........................... | 429/231.8 |
| 6,723,299 B1 | 4/2004 | Chen et al. | |
| 2002/0068170 A1 * | 6/2002 | Smalley et al. ............. | 428/403 |
| 2002/0081380 A1 | 6/2002 | Dillon et al. | |
| 2002/0092613 A1 | 7/2002 | Kuper | |
| 2002/0102193 A1 | 8/2002 | Smalley et al. | |
| 2002/0102194 A1 | 8/2002 | Smalley et al. | |
| 2002/0127171 A1 | 9/2002 | Smalley et al. | |
| 2002/0159944 A1 | 10/2002 | Smalley et al. | |
| 2002/0172767 A1 | 11/2002 | Grigorian et al. | |
| 2003/0004058 A1 | 1/2003 | Li et al. | |
| 2003/0031620 A1 | 2/2003 | Harutyunyan et al. | |

FOREIGN PATENT DOCUMENTS

| | | |
|---|---|---|
| CN | 1335257 A | 2/2002 |
| EP | 0 949 199 A1 | 10/1999 |
| EP | 1 061 040 A1 | 12/2000 |
| EP | 1 092 680 A1 | 4/2001 |
| JP | 06228824 A | 8/1994 |
| JP | 08198611 A | 8/1996 |
| JP | 08231210 A | 9/1996 |
| JP | 08290908 A | 11/1996 |
| JP | 08325007 A | 12/1996 |
| JP | 09188509 A | 7/1997 |
| JP | 10120409 A | 5/1998 |
| KR | 2001-0049398 | 6/2001 |
| KR | 2001-0049453 | 6/2001 |
| KR | 2001-0049546 | 6/2001 |
| RU | 2 085 484 C1 | 7/1997 |
| RU | 2 086 503 C1 | 8/1997 |
| RU | 2 133 727 C1 | 7/1999 |
| WO | WO 97/32571 * | 9/1997 |
| WO | WO 00/61492 | 10/2000 |
| WO | WO 01/16023 A1 | 3/2001 |
| WO | WO 01/57284 A1 | 8/2001 |
| WO | WO 01/92381 A1 | 12/2001 |
| WO | WO 02/016257 A3 | 2/2002 |
| WO | WO 02/060813 A2 | 8/2002 |
| WO | WO 02/076888 A1 | 10/2002 |

OTHER PUBLICATIONS

Liu et al. "Organizing Single–Walled Carbon Nanotubes on Gold Using a Wet Chemical Self–Assembling Technique", Langmuir vol. 16, No. 8, Mar. 24, 2000, pp. 3569–3573.*
Liu et al. "Controlled deposition of individual single–walled carbon nanotubes on chemically functionalized templates" Chemical Physics Letters, vol. 303, Apr. 2, 1999, pp. 125–129.*
Burghard et al. "Controlled Adsorption of Carbon Nanotubes on Chemically Modified Electrode Arrays" Advanced Materials, vol. 10, No. 8, 1998, pp. 584–588.*
Kuo–Yann Lai, Llquid Detergents—surfactant science series vol. 67, 1997, Marcel Dekker Inc., pp. 50–52.*
Krstic et al., Langmuir–Blodgett Films of Matrix–Diluted Single–Walled Carbon Nanotubes, Chem. Mater., vol. 10, pp. 2338–2340, 1998.
A.C. Rinzler, et al.; "Large–scale purification of single–wall carbon nanotubes: process, product, and characterization" Applied Physics A 67, 117 (1998) pp. 29–37.
G.S. Duesberg, et al; "Rapid Communication; Chromatographic size separation of single–wall carbon nanotubes"; Applied Physics A; (1998) pp. 117–119.
Jie Liu, et al.; "Fullerene Pipes"; Science vol. 280; (May 22, 1998); pp. 1253–1256.

(Continued)

Primary Examiner—Stuart L. Hendrickson
Assistant Examiner—Peter J Lish
(74) Attorney, Agent, or Firm—Law Offices of John Gibson Semmes

(57) ABSTRACT

Methods of aligning single walled carbon nanotube structures into selected orientations for a variety of different applications are achieved by initially dispersing the nanotube structures in aqueous solutions utilizing a suitable dispersal agent. The dispersal agent coats each individual nanotube structure in solution. The dispersal agent may be substituted with a suitable functional group that reacts with a corresponding binding site. Dispersed nanotube structures coated with substituted dispersal agents are exposed to a selected array of binding sites such that the nanotubes align with the binding sites due to the binding of the substituted functional groups with such binding sites. Alternatively, crystalline nanotube material is formed upon deposition of dispersed nanotube structures within solution into channels disposed on the surface of the substrate. Combining dispersal agent chemical modification techniques with deposition of the nanotubes into substrate channels is also utilized to produce useful structures.

44 Claims, 7 Drawing Sheets

OTHER PUBLICATIONS

Figure 1C:
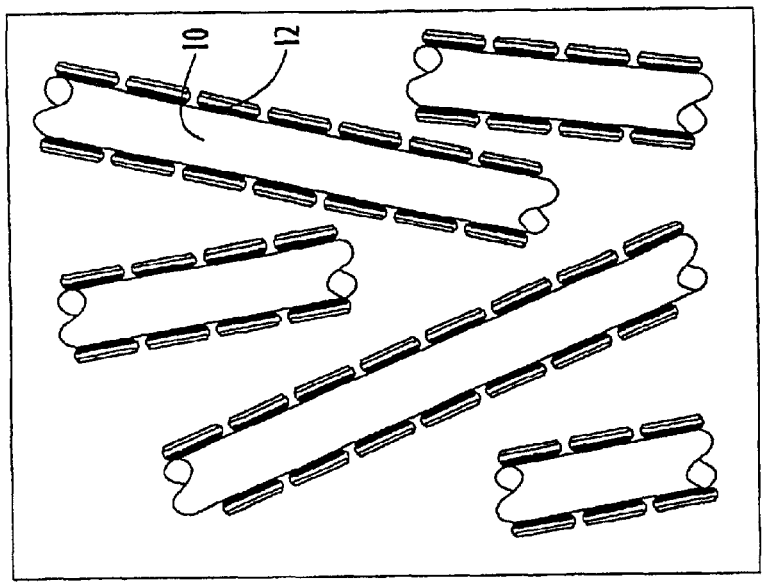

Konstantin B. Shelimov, et al.; "Purification of single-wall carbon nanotubes by ultrasonically assisted filtration"; Chemical Physics Letters 282; (1998) pp. 429–434.

Kevin D. Ausman, et al.; "Organic Solvent Dispersions of Single-Walled Carbon Nanotubes: Toward Solutions of Pristine Nanotubes"; American Chemical Society.

* cited by examiner

SPATIAL LOCALIZATION OF DISPERSED SINGLE WALLED CARBON NANOTUBES INTO USEFUL STRUCTURES

CROSS-REFERENCE TO RELATED APPLICATIONS

This application claims priority from U.S. Provisional Patent Application Ser. No. 60/303,815, entitled "Spatial Localization of Dispersed Single Walled Carbon Nanotubes Into Useful Structures" and filed Jul. 10, 2001. The disclosure of the above-mentioned application is incorporated herein by reference in its entirety.

GOVERNMENT INTERESTS

This invention was made with Government support under contract NCC9-41 awarded by the National Aeronautics and Space Administration. The Government may have certain rights in the invention.

BACKGROUND OF THE INVENTION

1. Technical Field

The present invention relates to spatially oriented single walled carbon nanotube structures and corresponding methods for spatially combining single walled carbon nanotube structures dispersed in solution into oriented structures useful for a variety of applications.

2. Description of the Related Art

Since the discovery of carbon nanotubes in 1991, research relating to the physical and electrical properties of single walled carbon nanotube (SWCNT) structures indicate the wide variety of commercial applications for such structures, including composite materials, nanoelectronic circuits, field emitter arrays, electrical capacitors and thermal management materials. Accordingly, a number of different manufacturing techniques have been derived to produce SWCNT structures based upon a growing demand for such structures by research facilities. The three most common manufacturing methods developed for producing SWCNT structures are high pressure carbon monoxide (HipCO) processes, pulsed laser vaporization (PLV) processes and arc discharge (ARC) processes. Each of these processes produce SWCNT structures by depositing free carbon atoms onto a surface at high temperature and/or pressure in the presence of metal catalyst particles. The raw material formed by these processes includes SWCNT structures formed as bundles of tubes embedded in a matrix of contaminating material. Depending upon the type of process utilized, such contaminating material may include amorphous carbon (i.e., graphene sheets of carbon atoms not forming SWCNT structures), metal catalyst particles, organic impurities and various fullerenes. The bundles of nanotubes that are formed by these manufacturing methods are extremely difficult to separate.

One of the difficulties facing carbon nanotube researchers is the ability to provide SWCNT material in a defined spatial orientation or to gain access to the complete surface of individual SWCNT structures. The ability to manipulate SWCNT structures for use in different commercial applications is of great importance, particularly in areas of the composite materials and nano-electronics. For example, where SWCNT material may be utilized to strengthen a material such as an epoxy resin, it is important for SWCNT structures to be completely dispersed and embedded within the resin. If the SWCNT structures remain bundled and are not evenly dispersed within the resin, little or no structural strength is gained from the addition of the SWCNT material to the resin. Similarly, SWCNT structures must be appropriately aligned on a substrate in order to be effective as nano-electronic components. One method developed recently for aligning SWCNT material on a substrate is referred to as "constructive destruction". In this method, SWCNT material is randomly deposited onto a substrate, followed by the formation of a series of electrodes onto the substrate surface. Upon application of an appropriate voltage to the substrate via the electrodes, certain unwanted SWCNT structures are destroyed while desirable SWCNT remain intact on the substrate surface. A problem with this "constructive destruction" process is that it requires exhaustive testing prior to the removal of the unwanted individual SWCNT structures and, thus, may not be easily transformed into a suitable manufacturing process for nano-electronic components.

Another method known in the art for aligning SWCNT structures on a substrate has been developed in an attempt to utilize SWCNT structures as field emitters in flat screen displays. The method involves mixing SWCNT structures into a polymer to form a matrix that is subsequently extruded through a grid to produce a flat material having numerous projections on its surface. Each projection on the surface of the material is tested to determine whether a SWCNT structure has randomly aligned within that projection in a parallel direction to the longitudinal axis of that projection. If a number of SWCNT structures have randomly aligned with neighboring projections on the material surface, those SWCNT structures will in essence form a field emitter array that can be used in a flat screen display. However, this method is expensive and extremely haphazard due to the randomness associated with aligning SWCNT structures within the material. An effective field emitter array requires well over 75% of SWCNT structures properly aligned with the projections in order to achieve a flat screen display that is usable and has an appropriate resolution and, hence, the yield of suitable arrays is low.

A further serious technical problem that impacts all of the research areas associated with aligning SWCNT structures into desired spatial orientations is the lack of available purified SWCNT material for use by researchers. The production of useful SWCNT structures for research drastically limits the design and testing of applications for carbon nanotubes. Indeed, such limitations inhibit the advancement of carbon nanotube technology and the implementation of SWCNT structures into commercial applications.

In a related patent application, U.S. patent application Ser. No. 09/932,986, filed Aug. 21, 2001 and incorporated herein by reference in its entirety, novel methods are disclosed for effectively purifying and isolating SWCNT structures in aqueous solutions for use in commercial and research applications. Those methods include solubilizing and dispersing SWCNT structures in aqueous solutions containing certain chemical compounds referred to as dispersal agents. The disclosed dispersal agents include synthetic and naturally occurring detergents or any other compositions capable of encapsulating and suitably solubilizing hydrophobic compounds in aqueous solutions. A matrix of raw material containing SWCNT structures bundled together with impurities (e.g., metal catalyst particles and amorphous carbon) is immersed within an aqueous solution containing an effective amount of a dispersal agent. The dispersal agent encapsulates the individual SWCNT structures and effects a separation of those structures from the impurities. While the methods and products described in Ser. No. 09/932,986 are highly effective in providing isolated and purified SWCNT structures dispersed in aqueous solution, the problem of effectively manipulating the individual SWCNT structures into specific spatial orientations still remains.

Accordingly, there exists a need to manipulate individual SWCNT structures into desired orientations for different research and commercial applications.

SUMMARY OF THE INVENTION

Therefore, in light of the above, and for other reasons that will become apparent when the invention is fully described, an object of the present invention is to provide a method for manipulating individual SWCNT structures in selected spatial orientations. The manipulated SWCNT structures can be used in research and commercial applications.

Another object of the present invention is to form a matrix of aligned SWCNT structures having a selected orientation and spacing from each other.

A further object of the present invention is to incorporate the matrix of aligned SWCNT structures within a material to provide that material with enhanced structural properties.

A still further object of the present invention is to produce long fibers of aligned SWCNT material for use in research and commercial applications.

Yet another object of the present invention is to manipulate the long fibers of aligned SWCNT material in suitable orientations with respect to each other for use in a variety of electrical and material applications.

The aforesaid objects may be achieved individually and/or in combination, and it is not intended that the present invention be construed as requiring two or more of the objects to be combined unless expressly required by the claims attached hereto.

According to certain aspects of the present invention, SWCNT structures dispersed in aqueous solution and coated with a suitable dispersal agent are manipulated into suitable spatial orientations utilizing at least one of a chemical binding mechanism and a physical aligning mechanism. In the chemical binding mechanism, the dispersal agent is substituted with a first chemical compound having a functional group that is reactive with a second chemical compound. Upon dispersing SWCNT structures coated with the dispersal agent in solution, the SWCNT structures are manipulated into selected spatial orientations by exposing the structures to an array of second chemical compounds, resulting in a binding reaction between the first and second chemical compounds.

Depending on the particular application and the specific dispersal agent utilized to disperse raw SWCNT material, chemical modification of the dispersal agent is carried out either prior to addition of the dispersal agent to SWCNT material, or after the dispersal agent is associated with the surface of individually dispersed SWCNT's in an aqueous dispersion. In the physical aligning mechanism, the dispersed SWCNT structures coated with dispersal agent are deposited into pre-formed channels on a substrate. Upon deposition of solution containing the SWCNT structures into the channels, the solution may be removed (e.g., by evaporation) leaving crystalline SWCNT fiber material formed within the channels. The SWCNT structures can be further guided into the channels by chemically attracting the dispersal agent with the interior surface of the channel. In one exemplary embodiment, the channel surfaces are provided with a hydrophilic layer while the substrate surface is provided with a hydrophobic layer such that SWCNT structures coated with dispersal agent molecules having an exposed hydrophilic surface will be attracted within the channels.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIGS. 1*a*–1*c* provide a conceptual representation of SWCNT structures mixed with dispersal agent molecules in aqueous solution.

FIG. 2 provides a conceptual representation of dispersed SWCNT structures coated with derivatized dispersal agent molecules.

FIGS. 3*a*–3*c* provide a conceptual representation of dispersed SWCNT structures coated with methyl-β-cyclodextrin derivatized with N-(p-maleimidophenyl) isocyanate.

FIGS. 4*a*–4*b* provide a conceptual representation of a SWCNT polymer matrix formed utilizing dimercaptomethane as a cross-linking compound between individual SWCNT structures coated with methyl-β-cyclodextrin derivatized with N-(p-maleimidophenyl) isocyanate.

FIGS. 5*a*–5*d* are elevated views in section of a channel with SWCNT material in solution deposited within the channel in accordance with certain aspects of the present invention.

FIGS. 6*a*–6*c* are elevated views in section of a sheet containing a plurality of rows of channels with SWCNT material in solution deposited within the channels in accordance with certain aspects of the present invention.

FIG. 7 is an elevated view in section of a plurality of sheets combined together, with each sheet containing channels with SWCNT material in solution deposited within the channels in accordance with certain aspects of the present invention.

FIGS. 8*a*–8*c* are elevated views in section of a substrate containing an underlay and an overlay, with channels etched into the overlay in accordance with certain aspects of the present invention.

FIG. 9 is a plan view of crystalline SWCNT material deposited within channels of a substrate to form a component of an electronic circuit.

DETAILED DESCRIPTION OF THE PREFERRED EMBODIMENTS

The ability of dispersal agents to effectively purify and isolate SWCNT structures within an aqueous solution is disclosed in U.S. patent application Ser. No. 09/932,986. A dispersal agent, as disclosed in that application, can be any suitable reagent that is effective in substantially solubilizing and dispersing SWCNT structures in an aqueous solution by increasing the interaction at the surface interface between each nanotube structure and water molecules in solution. The underlying mechanisms whereby a dispersal agent brings about dispersion of individual SWCNT structures, from the "bundles" or "ropes" in which they are constitutively formed, into an aqueous solution is primarily based upon the ability of the dispersal agent to break down the molecular forces at the surface of the SWCNT structure preventing water molecules from interacting with the SWCNT surface. In addition, due to the large surface area of the SWCNT structure, the dispersal agent preferably has a molecular structure that maximizes its ability to reduce hydrophobic interactions between individual SWCNT structures, while also being of a small enough size to easily penetrate into inter-SWCNT spaces. An efficient SWCNT dispersal agent can remain in aqueous solution at a high enough concentration so that a useful dispersal agent concentration is maintained for SWCNT "bundle" or "rope" dispersal, even after a portion of the original amount in solution has been utilized for the dispersion of non-SWCNT contaminants in the raw nanotube material. The dispersal agent is typically added to an aqueous solution in an amount effective to substantially purify and disperse SWCNT structures in solution by coating and effectively forming a sheath around individual SWCNT structures. The effective amount of dispersal agent will vary based upon the type of dispersal agent utilized in a particular application. Exemplary concentrations of dispersal agents effective in suitably dispersing SWCNT structures in an aqueous solution are disclosed in U.S. patent application Ser. No. 09/932,986.

Figure 1B:
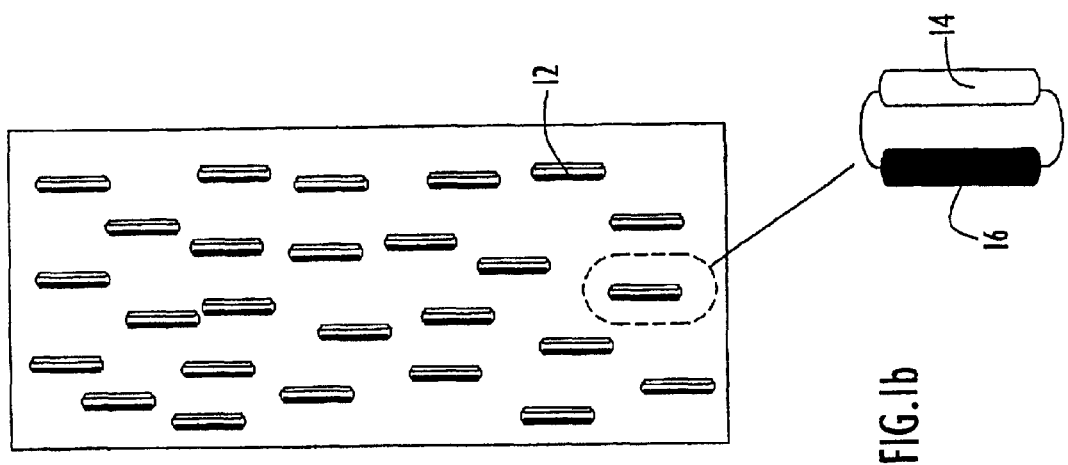
Figure 1A:
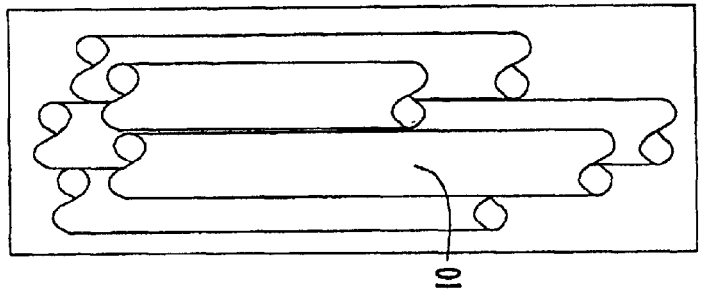

SWCNT structures dispersed in an aqueous solution with a suitable dispersal agent essentially act as colloidal material. The SWCNT structures are individually coated with a layer of dispersal agent suspended in an aqueous solvent. The dispersal agent molecules useful in producing such mixtures have both hydrophobic and hydrophilic properties, where the hydrophobic portions of the dispersal agent interact with the surface of an SWCNT structure and the hydrophilic portions interact with the aqueous solvent molecules. The interaction between SWCNT structures and dispersal agents is conceptually illustrated in FIGS. 1a–1c, with bundled SWCNT structures 10 depicted in FIG. 1a, dispersal agent molecules 12 in aqueous solution depicted in FIG. 1b, and an aqueous dispersion of individual SWCNT structures coated with dispersal agent depicted in FIG. 1c. The hydrophilic and hydrophobic regions of each dispersal agent molecule are generally depicted as region 14 and region 16, respectively. Upon encountering bundles of SWCNT structures in solution, the dispersal agent molecules effect a separation of individual SWCNT structures by coating the structures as depicted in FIG. 1c, where the hydrophobic portions of the dispersal agent molecules interact with the surface of the SWCNT structures and the hydrophilic portions are exposed to the aqueous solution.

Suitable dispersal agents for use in practicing the present invention may be synthetic or naturally occurring detergents or any other composition capable of encapsulating and suitably solubilizing hydrophobic compounds in aqueous solutions. Exemplary dispersal agents include, without limitation, synthetic or naturally occurring detergents having high surfactant activities such as detergents having a hydrophilic-lipophilic balance value no greater than about 13.2, octyl-phenoxypolyethoxyethanol (commonly referred to as Nonidet P-40 or (NP-40), polyoxyethylene sorbitol esters (e.g., TWEEN® and EMASOL™ series detergents), poloxamers (e.g., the Pluronic™ series of detergents and Poloxamer 188, which is defined as $HO(C_2H_4O)_a(C_3H_6O)_b(C_2H_4O)_aH$, with the ratio of a to b being 80 to 27 and the molecular weight being in the range of 7680 to 9510) and ammonium bromides and chlorides (e.g., cetyltrimethylammonium bromide, tetradecylammonium bromide and dodecylpyrimidinium chloride), naturally occurring emulsifying agents such as deoxycholates and deoxycholate-type detergents (e.g., taurocholic acid), sapogenin glycosides (e.g., saponin) and cyclodextrins (e.g., α-, β- or γ-cyclodextrin), chaotropic salts such as urea and guanidine, and ion pairing agents such as sulfonic acids (e.g.,1-heptane-sulfonic acid and 1-octane-sulfonic acid).

The present invention builds upon the concepts of dispersing SWCNT structures in aqueous solutions with dispersal agents, as described above, by manipulating SWCNT structures coated with a suitable dispersal agent and utilizing chemical binding techniques, physical alignment techniques or a combination of both techniques.

Chemical Binding Techniques

The chemical binding techniques of the present invention are based upon the recognition that certain chemically reactive groups have an affinity for reacting and binding with other reactive groups under certain conditions and that individual SWCNT structures may be manipulated by manipulating the dispersal agent molecules which coat the SWCNT structures. A suitable dispersal agent may be chemically modified to substitute a suitable chemical compound at one or more reactive sites on the dispersal agent. The chemical compound includes a plurality of reactive groups. Reactive sites and reactive groups can be chemical groups that are constituents of a larger structure and that are either functional (i.e., reactive with other chemical groups) or non-functional but capable of modification to become functional. A first reactive group of the chemical compound binds to a first reactive site on the dispersal agent, leaving a second reactive group exposed for binding with a second reactive site. The SWCNT structures are aligned in a selected spatial orientation upon being exposed to a series of second reactive sites. The SWCNT structures become aligned as a result of being manipulated by dispersal agent molecules which coat the individual SWCNT structures, where the second reactive groups substituted onto the dispersal agent molecules are attracted to and bind with the second reactive sites. The second reactive sites may be aligned in any selected manner to force alignment of the SWCNT structures with those reactive sites.

A dispersal agent can be derivatized by chemically binding a suitable chemical compound to the dispersal agent (i.e., via the binding of a first reactive group on the chemical compound to a first reactive site on the dispersal agent). Derivatization of the dispersal agent can be achieved utilizing a variety of techniques. In one exemplary technique, the derivatization process is accomplished while the dispersal agent is in the solid or aqueous form prior to being added to raw material including SWCNT structures. After derivatization, the modified dispersal agent can then be used to disperse SWCNT structures within aqueous solution. In an alternative technique, an unmodified dispersal agent is first used to disperse SWCNT structures in aqueous solution, followed by derivatizing the dispersal agent while it is interacting with the surface of SWCNT structures. In either approach, the derivatized dispersal agent effectively interacts with and coats SWCNT structures while having second reactive groups exposed for a binding reaction with second reactive sites.

Figure 2:
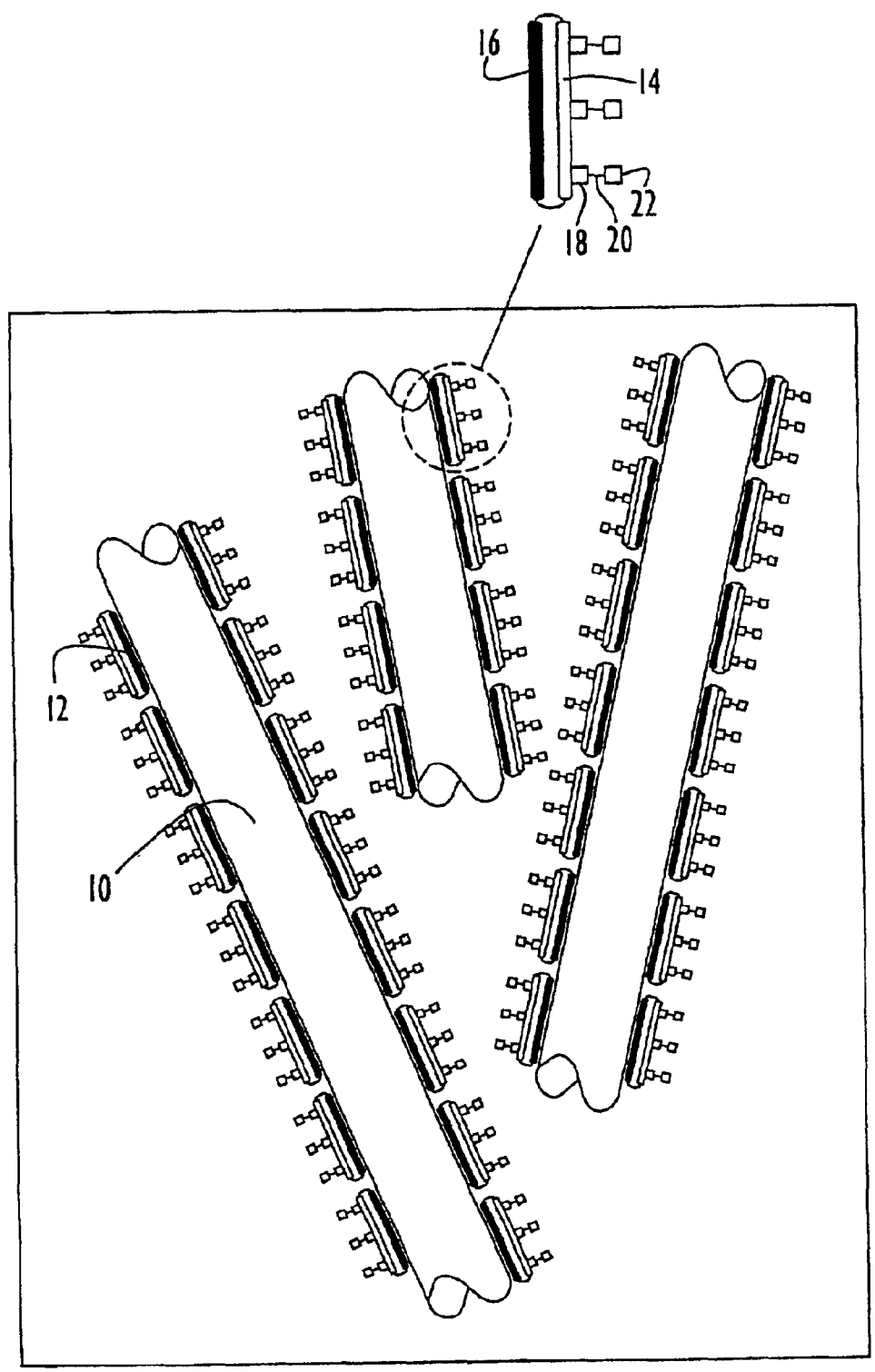
Figure 3C:
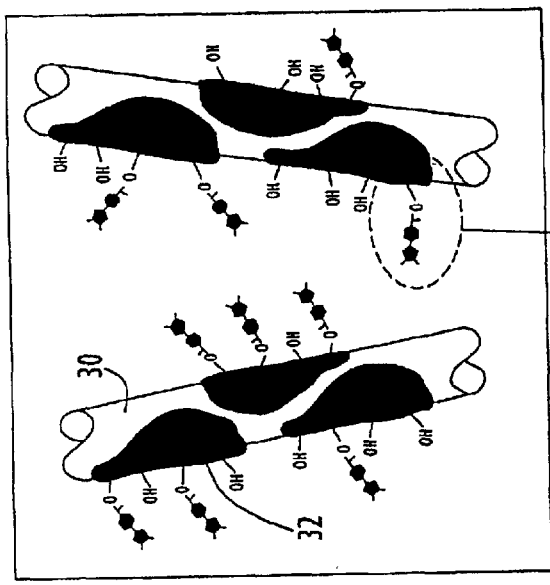
Figure 3C:
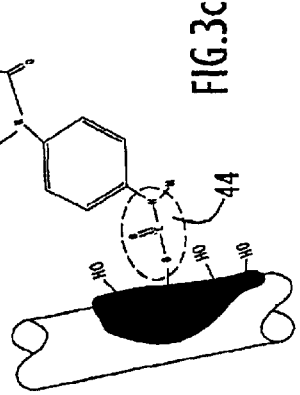
Figure 3B:
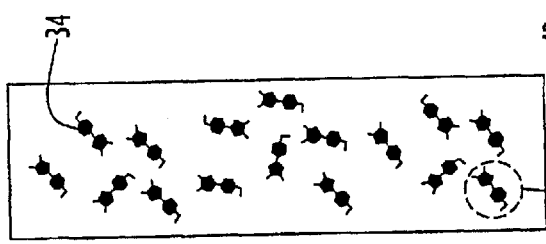
Figure 3B:
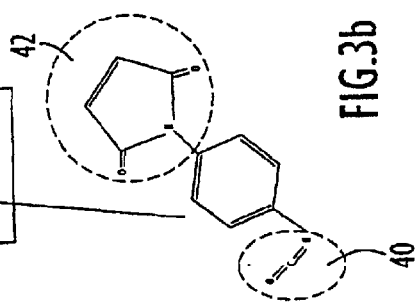
Figure 3A:
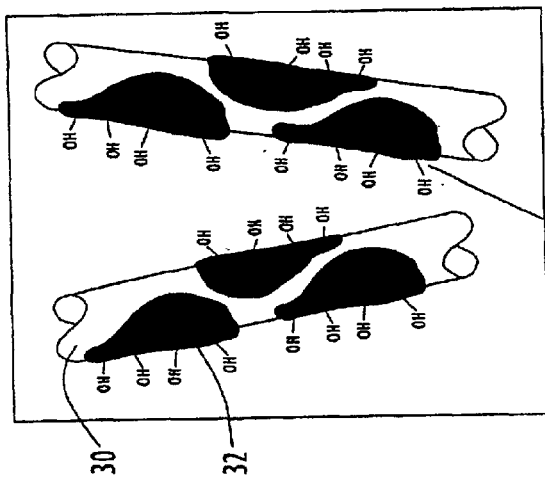
Figure 3A:
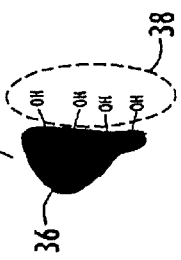
Figure 4B:
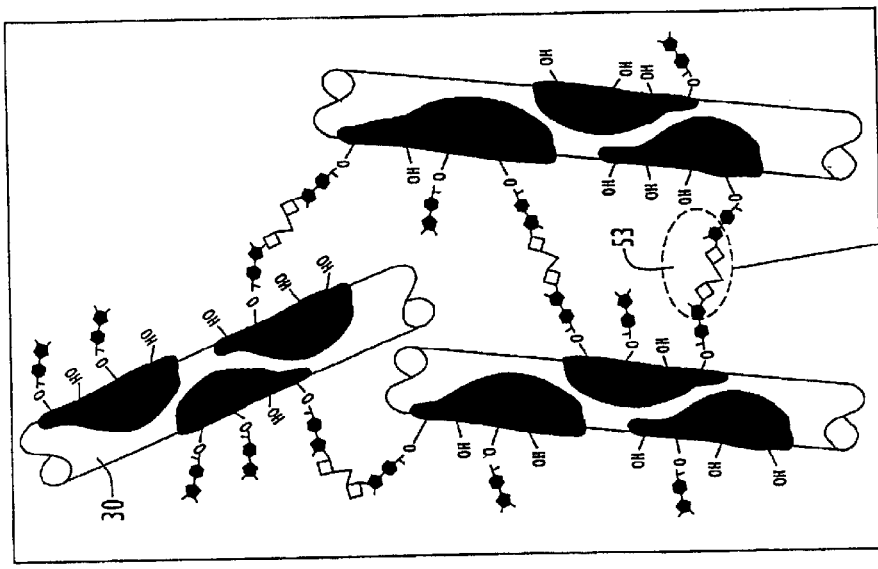
Figure 4B:
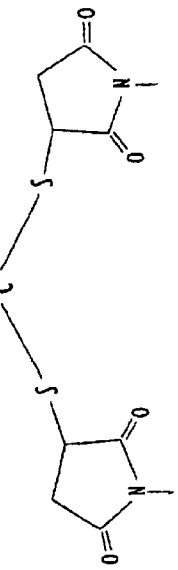
Figure 4A:
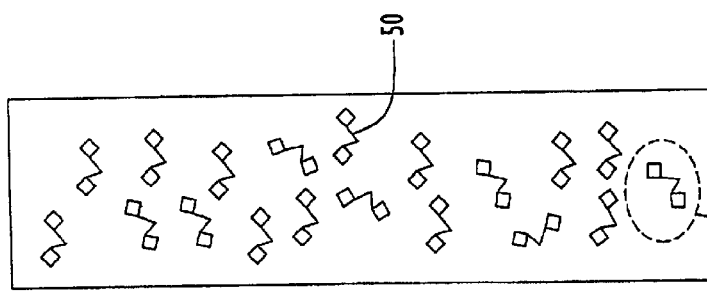
Figure 4A:
Figure 5A:
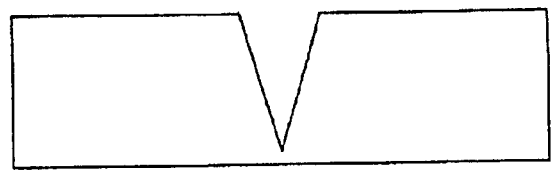
Figure 5B:
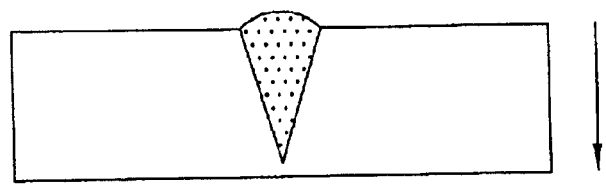
Figure 5C:
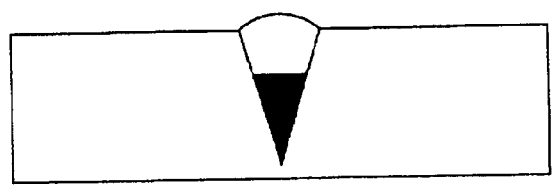
Figure 5D:
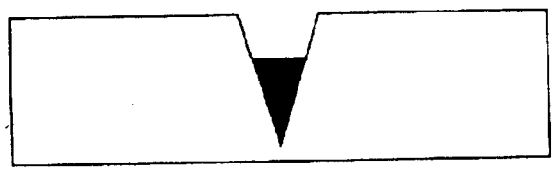

The derivatization of dispersal agent molecules is conceptually illustrated in FIG. 2. A first reactive group 18, which is connected to a base structure 20, binds at a first reactive site on the hydrophilic portion 14 of a dispersal agent molecule 12. The base structure can be any aliphatic or aromatic hydrocarbon having a straight or branched chain configuration of any selected length, with the first and second reactive groups disposed at any suitable locations along the base structure. The distance between the first and second reactive groups may be selected, e.g., by providing one or more suitable spacer arms between the reactive groups. The spacer arms are preferably non-functional and may be a hydrocarbon or other chain polymer that provides a desired separation between reactive groups on the base structure. In FIG. 2, base structure 20 includes a second reactive group 22 at an end of the base structure opposing first reactive group 18. The second reactive group is suitably aligned on the base structure for allowing free access of the second reactive group with a second reactive site. SWCNT structures 10 depicted in FIG. 2, which are coated with derivatized dispersal agent molecules 12, may thus be spatially manipulated by exposing the SWCNT structures to second reactive sites to which second reactive groups 22 will bind. The second reactive sites may be located and aligned on any structure that will effect the desired spatial orientation of SWCNT structures. For example, the second reactive sites may be disposed along any base polymer or other substrate at selected locations to achieve a desired alignment of SWCNT structures immobilized at those reactive sites. Alternatively, second reactive sites may be disposed on the dispersal agent molecules coating the SWCNT structures, thus effecting a binding of SWCNT structures to each other in a selected matrix based upon the locations of the second reactive sites on the dispersal agent molecules.

Derivatization of a selected dispersal agent to provide it with desired reactive or functional properties preferably will not alter the overall properties of that dispersal agent, particularly its water solubility and its ability to interact with and coat SWCNT structures. It is noted that, in the functionalization and derivatization of biological compounds (e.g., proteins), it is also important to maintain the intrinsic properties and activities of a particular biological compound after derivatization. In realizing the similarities between the desirable features for derivatizing biological compounds and derivatizing SWCNT structures, the inventors of the present invention have determined that many of the reactive groups known for derivatizing biological compounds are also useful for derivatizing the dispersal agents described above.

Chemical cross-linkers typically utilized for derivatizing biological compounds are also useful in spatially orienting dispersed SWCNT structures in a desired configuration. One type of suitable cross-linking agent utilizes heterobifunctional structures with reactive groups that derivatize a dispersal agent under one set of reaction conditions and effect a cross-linking of dispersed SWCNT structures to other reactive sites under a different set of reaction conditions. The use of different reactive groups having different reaction conditions may be of value, e.g., in situations where it is desirable to prevent the direct cross-linking between dispersal agent molecules coating the same or neighboring SWCNT structures. Alternatively, a homobifunctional cross-linking agent may be utilized, where all of the reactive groups on the cross-linking agent have the same or similar reaction conditions. Homobifunctional cross-linkers are useful, e.g., if direct cross-linking between SWCNT structures or dispersal agent molecules on the same SWCNT structure is desired. A combination of homo- and heterobifunctional cross-linking agents may further be employed to achieve any desired interconnection and spacing between neighboring SWCNT structures or individual SWCNT structures and any supporting structure. Any cross-linking agent typically utilized to derivatize biological compounds may be used in practicing the present invention provided the cross-linking agent is capable of reacting with reactive groups present on the dispersal agent without affecting the dispersal agent's ability to effectively coat and disperse SWCNT structures. Thus, the chemical properties of a wide range of different compounds can be conveyed to dispersed SWCNT structures.

Chemical cross-linking of reactive groups to SWCNT dispersal agents is preferably carried out under mild aqueous conditions, particularly in situations where derivatization of the dispersal agent occurs after the dispersal agent has coated SWCNT structures. The conditions are preferably similar to those utilized for derivatization of biological compounds such as proteins and carbohydrates. Exemplary reactive groups suitable for use in practicing the present invention include, without limitation, ester groups of N-hydroxysuccinimide or NHS (reactive to amine groups), 1-ethyl-3-(3-dimethylaminopropyl)carbodiimide hydrochloride or EDC groups (reactive to carboxyl groups), maleimide groups (reactive to sulfhydryl groups), isocyanate groups (reactive to hydroxyl groups), azidophenyl groups (reactive to non-functional groups such as methyl groups via a photolysis reaction), and hydrazide groups (reactive to aldehyde groups). A wide variety of commercially available homo- and heterobifunctional cross-linking agents which utilize one or more of those reactive groups are available, along with standard reaction protocols (including operating conditions, suitable concentrations and buffers, etc.) for utilizing those agents, from Pierce Chemical company (Rockford, Ill.). The available reaction protocols for any of those cross-linking agents may be utilized to effect a derivatization of any of the dispersal agents described above, with the exception of chaotropic salts, when the required reactive group is constitutively present in the dispersal agent and is available for chemical reaction. Alternatively, the dispersal agent can be chemically derivatized to produce such a reactive group without losing its SWCNT dispersing properties. The selection of a specific cross-linking agent for use in aligning SWCNT structures in accordance with the present invention will depend in part on the specific dispersal agent utilized to disperse the SWCNT structures and thus the specific reactive sites disposed on that dispersal agent. For example, dispersal agents such as cyclodextrins or sapogenin glycosides have available hydroxyl (—OH) groups that are useful reactive sites, whereas the ion pairing agents have available carboxyl groups and the poloxamers have available methyl groups that are useful as reactive sites. By utilizing pre-existing groups present on the hydrophilic surface of SWCNT dispersal agents, dispersed SWCNT structures can be cross-linked, either directly to one another or to some other polymer or base structure, to selectively align the SWCNT structures in a desired spatial configuration.

A suitable heterobifunctional cross-linking agent for the derivatization of a dispersal agent containing hydroxyl groups is N-(p-maleimidophenyl) isocyanate, or PMPI. PMPI includes a first reactive group that binds with a hydroxyl group at a first reactive site on the dispersal agent molecule and a second reactive group that binds with a sulfhydryl group (also referred to as an S—H group or a thiol group) at a second reactive site. Another suitable heterobifunctional cross-linking agent is p-azidobenzoyl hydrazide, or ABH. ABH reacts under light-activated conditions with a methyl group at a first reactive site on the dispersal agent. The ABH molecule further includes a second reactive group, hydrazide, that reacts with aldehyde groups at second reactive sites. Other heterobifunctional cross-linking agents that are useful in combination with dispersal agents of the polymer type (e.g., Poloxamer 188 and NP-40) are derivatives of 4-azido-2,3,5,6-tetrafluorobenzoic acid. Those derivatives are covalently inserted into the C—H bonds of the dispersal agent polymer structure via a light-activated nitrene reaction below about 350 nm, leaving a second reactive group projecting from the surface of the polymer molecule and that is reactive to either thiols or amines. Dispersal agents can also be further derivatized by using additional heterobifunctional cross-linking agents that are reactive to a reactive group already substituted on the dispersal agent. For example, N-ε-maleimidocaproic acid, or EMCA, and sulfosuccinimidyl 4-(N-maleimidomethyl)-cyclohexane-1-carboxylate, or Sulfo-SMCC, each contain functional groups that are reactive to thiols and amines. A SWCNT structure coated, e.g., with cyclodextrin molecules already derivatized with PMPI molecules that have been reacted with a dithiol compound (e.g., dimercaptomethane) may be further derivatized with, e.g., EMCA, to functionalize the cyclodextrin coated SWCNT structure such that it is now reactive with amine groups. Many other heterobifunctional reactive compounds are known in the biological field and can be applied to the present invention for derivatizing and functionalizing dispersal agents coating SWCNT structures, with the selection of a specific compound being based upon its affinity for reactivity with a particular dispersal agent.

An exemplary dispersal agent useful for derivatization is the cyclodextrin class of compounds. This class of compounds, which is separable into three sub-classes (i.e., the alpha, beta and gamma cyclodextrins), includes naturally occurring compounds comprising repeating sugar units. The torsional molecular structure of these compounds provides a hydrophobic pocket region that enables their ability to disperse SWCNT's into an aqueous solution. Additionally, the solubility of cyclodextrin compounds is significantly enhanced by substitution of the outer regions of the cyclodextrin molecule with certain chemical groups including, without limitation, methyl, 2-hydroxy-propyl, triacetyl and hydroxyethyl groups. Chemical modification of the cyclodextrin structure in this manner further maintains the physical and chemical properties of the cyclodextrin molecules with regard to their SWCNT dispersal capacity. In particular, two exemplary derivatives of beta-cyclodextrin, namely, 2-hydroxy-propyl beta-cyclodextrin (2-HPβC) and methyl beta cyclodextrin (MβC), are highly effective with regard to their ability to disperse SWCNT structures in aqueous solution and purify the structures from typical impurities existing in raw material produced from conventional nanotube production processes.

Cyclodextrin compounds have a number of desirable physical and chemical properties that allow the manipulation of dispersed SWCNT structures. For example, cyclodextrin compounds exhibit an affinity for hydrophilic surfaces. When SWCNT structures are dispersed in an aqueous solution containing an effective amount of cyclodextrin, each individual SWCNT structure is coated with at least enough cyclodextrin molecules to confer water solubility on the SWCNT structures. The cyclodextrin coating on the individual SWCNT structure essentially forces the coated structure to behave in aggregate with the cyclodextrin molecules adhered to its surface. By utilizing the hydrophilic properties of cyclodextrin molecules, it is possible to physically manipulate the SWCNT structures using methods that are typically applied to manipulating cyclodextrin molecules. However, the manipulation of SWCNT structures is not limited to using derivatized cyclodextrin molecules coating the SWCNT structures. Rather, any of the dispersal agents described above may be derivatized with suitable reactive groups to facilitate the manipulation of the SWCNT structures in a selected manner.

Cyclodextrin molecules can be substituted to enhance the ability of dispersing SWCNT structures in aqueous solutions. For example, β-cyclodextrin can be substituted with either methyl, 2-hydroxyl-propyl, triacetyl or hydroxyethyl groups to confer increased water solubility on the parent β-cyclodextrin compound, while still maintaining the ability of the substituted β-cyclodextrin to disperse SWCNT structures from raw material. Furthermore, additional chemical substitution on the β-cyclodextrin does not alter its ability to disperse SWCNT material. Chemical substitution of reactive groups on the cyclodextrin ring structure can occur via the hydroxyl groups present on each of the glucose molecules that make up the cyclodextrin ring. In the case of the β-cyclodextrin ring, there are 7 glucose molecules per β-cyclodextrin ring and 3 hydroxyl groups per glucose molecule. The mean degree of substitution of the parent β-cyclodextrin compound with methyl groups, in order to produce MβC, is 10.5–14.5 out of a total of 21 possible substitution sites on the parent methyl-cyclodextrin molecule. This leaves a minimum of 6 remaining substitution sites on the MβC molecule available for substitution with other reactive groups. In the case of 2-HPβC, the mean degree of substitution is 4–10, leaving a minimum of 11 additional substitution sites on the 2-HPβC molecule available for substitution with other reactive groups. This does not account for potential multiple substitutions at one particular site that could also result in an increase in the overall potential number of useful substitution sites available on the cyclodextrin molecule. The number of substitution sites per cyclodextrin ring will depend on its sub-type, specifically the number of glucose molecules present per ring (i.e., 6 glucose molecules in α-cyclodextrin, 7 glucose molecules in β-cyclodextrin, 8 glucose molecules in γ-cyclodextrin).

In one example of a derivatized dispersal agent useful for manipulating SWCNT structures, a MβC compound is modified using the heterobifunctional reactive compound PMPI. This compound reacts with hydroxyl groups present on the cyclodextrin molecule via an isocynate group to form a carbamate linkage in aqueous conditions at a pH of about 8.5 (i.e., conditions that are easily achieved in aqueous dispersions of SWCNT material). It is noted that PMPI may also be utilized with any other dispersal agent that contains hydroxyl groups. An advantage of using PMPI is that the carbamate linkage formed under these mild conditions does not disrupt the molecular ring structure of the cyclodextrin compound, which maintains the hydrophobic/hydrophilic nature of the compound. Another advantage of this reaction scheme is that derivatization of cyclodextrin can be accomplished both before and after dispersal of raw SWCNT material into aqueous dispersions. A further advantage to utilizing this reaction scheme is that any remaining unreacted PMPI can be removed from the SWCNT dispersion by size exclusion chromatography.

A conceptual representation of PMPI derivatization of MβC is illustrated in FIGS. 3*a*–3*c*. Specifically, FIG. 3*a* depicts an aqueous dispersion of SWCNT structures 30 coated with MβC molecules 32. Each MβC molecule contains four hydroxyl groups (i.e., represented by OH—) available for substitution by PMPI molecules 34 depicted in FIG. 3*b*. Although FIGS. 3*a*–3*c* depict the MβC molecules as being derivatized with PMPI molecules after dispersing SWCNT structures, it is noted that derivatization can also occur prior to dispersion of SWCNT structures. The hydrophobic portion 36 of each MβC molecule 32 interacts with and adheres to a SWCNT structure 30, while the hydrophilic portion 38 is exposed and provides substitution sites for an isocyanate group 40 of the PMPI molecules. The PMPI molecules also include a maleimide group 42 that is reactive with a thiol group. Upon exposure of the dispersed SWCNT structures in aqueous solution containing PMPI molecules and at a pH of about 8.5, the MβC molecules are derivatized with the PMPI molecules forming a carbamate linkage 44 as depicted in FIG. 3*c*.

An example of producing PMPI-derivatized cyclodextrin coated SWCNT structures is provided as follows. An aqueous dispersion of purified SWCNT structures are produced as described in U.S. patent application Ser. No. 09/932,986 using MβC as the dispersal agent. In one embodiment of this technique, raw SWCNT material is dispersed at 200 micrograms of SWCNT material in water containing 50 mg/ml MβC. Excess MβC is removed from the solution by using a size exclusion column (5000 dalton molecular weight cutoff), with the SWCNT material eluting in the column void volume. The purified MβC-coated SWCNT structures are concentrated by centrifugation at 10,000×g. The pelleted SWCNT material is then resuspended in a borate buffer (pH 8.5) that contains PMPI at a concentration of 8 mg/ml (a theoretical 10-fold molar excess of PMPI to the amount of —OH groups present on the MβC-dispersed SWCNT's based upon 200 micrograms of pelleted SWCNT material, with the maximum amount of MβC required to coat all of the SWCNT material being approximately 200 micrograms, and each MβC molecule having four hydroxyl groups available for reaction) resulting in a dispersion of individual MβC-coated SWCNT structures in which the isocyanate group reacts with the —OH groups present on the MβC molecules. The reaction is allowed to continue to room temperature for up to 12 hours with constant agitation. After this time, the solution is diluted with 10 volumes of borate buffer (pH 8.5) and any unreacted PMPI is removed from the SWCNT material by size exclusion column chromatography (5000 dalton molecular weight cut-off), the derivatized SWCNT material eluting in the column void volume. The PMPI-derivatized, MβC-dispersed SWCNT material is finally collected by centrifugation in preparation for reaction of the thiol-reactive maleimide group of the PMPI molecule now attached to the surface of the dispersed SWCNT structures.

After dispersion, the SWCNT structures coated with PMPI-derivatized MβC molecules are exposed to thiol groups selectively arranged at second reactive sites located, e.g., along a structural polymer. The SWCNT structures align with the polymer via reaction between the thiol groups arranged on the polymer and the maleimide groups on the PMPI-derivatized MβC molecules coating the SWCNT structures. The alignment and resultant array of SWCNT structures that forms will be based upon the polymer selected and the arrangement of thiol groups on that polymer. For example, a SWCNT/polymer matrix may be constructed where an array of SWCNT structures are cross-linked to each other via a bridging structural polymer. The intermolecular spacing between SWCNT structures within the matrix can be controlled by the addition of spacer arms within the cross-linker between the first and second reactive groups. Referring to FIG. 3*c*, a homobifunctional molecule such as dimercaptomethane ($CH_4S_2$), or DMM, is utilized to cross-link individually dispersed SWCNT structures together via the reaction between the thiol groups on DMM and the maleimide groups on the PMPI-derivatized MβC molecules coating the SWCNT structures.

An exemplary embodiment of a cross-linked SWCNT polymer matrix formed utilizing the cross-linkers PMPI and DMM is conceptually illustrated in FIGS. 4*a* and 4*b*. Specifically, FIG. 4*a* depicts DMM molecules 50 in aqueous solution. Upon addition of DMM molecules to the aqueous solution containing coated and dispersed SWCNT structures of FIG. 3*c* and at a pH of about 6.5, a maleimide-thiol reaction occurs forming thioether linkages 52 between SWCNT structures as depicted in FIG. 4*b*. In the example described above, pelleted PMPI-derivatized, MβC-dispersed SWCNT material collected by centrifugation is resuspended in borate buffer (pH 6.5) containing 0.2M DMM. The reaction is allowed to continue with agitation for up to 4 hours at room temperature until polymerized SWCNT material has formed in solution. The material can then be collected and washed with water by filtration across a 0.01 micron Teflon filter.

Depending on the type of SWCNT polymer matrix structure to be formed, the spacing between neighboring SWCNT structures may be altered by replacing DMM with similar dithiol compounds having longer hydrocarbon chains or spacer arms between the thiol groups, such as 1,3-dimercaptopropane ($C_3H_8S_2$) or 1,5-dipentanedithiol ($C_5H_{12}S_2$). Additionally, long chain graft copolymers may be utilized, such as polyethylene or polyvinyl polymers, that are also derivatized at multiple sites with different polymer molecules containing thiol groups. Such polymer structures can provide multiple cross-linking sites for SWCNT structures and can also be used to control the intermolecular distance between individual SWCNT structures within the polymer matrix. Polymer matrices of spatially oriented SWCNT structures are useful in a variety of research and commercial applications, in particular for forming structural materials of a desired strength.

Under certain circumstances it may be desirable to cross-link dispersal agent molecules on an individual SWCNT structure in order to produce a polymerized layer of dispersal agent that coats the entire SWCNT surface and that cannot be removed by washing in a polar or non-polar solvent. Referring to the previous example utilizing DMM, this can be achieved by modifying the relevant concentrations of DMM with respect to SWCNT structures. The structure of DMM contains two thiol groups separated by a single carbon atom. This molecular arrangement provides a very short spatial range or sphere of coupling. When one of the thiol groups present in this compound reacts with a maleimide group present on a PMPI-derivatized cyclodextrin, the other thiol group is available for reaction with a second maleimide group. In the previous example, the favorable second maleimide group is present on a neighboring PMPI-derivatized cyclodextrin-dispersed SWCNT structure, thus forming the SWCNT polymer matrix depicted in FIG. 4*b*. By reducing the concentration of both dispersed SWCNT structures and dithiol compound in solution, e.g., to a concentration of below about 0.1 microgram of PMPI-derivatized, MβC -dispersed SWCNT material in a borate buffer (pH 6.5) containing 0.01M dithiol compound, reaction of the second thiol group on the dithiol compound with a maleimide group on the same SWCNT structure is favored, thus producing a polymerized cyclodextrin layer on the surface of an individual SWCNT structure rather than a SWCNT polymer matrix compound. Similar approaches can be applied to any derivatized dispersal agent present on the surface of a dispersed SWCNT structure to produce a polymerized dispersal agent coating on individualized SWCNT structures.

Another example employing chemical modification of a MβC molecule is substitution with ABH. ABH is also a heterobifunctional cross-linker molecule typically used in biological applications. ABH non-specifically reacts with non-functional groups, such as methyl groups, on target molecules via a light-activated reaction. MβC compounds may be modified by substitution with ABH groups while maintaining their ability to disperse SWCNT structures in aqueous solution. As with PMPI derivatization of MβC, the derivatization of MβC with ABH can be accomplished both before and after the MβC coats and dispersed SWCNT structures. After derivatization of MβC using ABH via a light-activated reaction (e.g., 265–275 nm wavelength, 5–10 second exposure resulting in the coupling of ABH to non-reactive groups, such as methyl groups, present on the MβC via an azidophenyl photolysis reaction), excess unreacted ABH is removed from the SWCNT dispersion by size exclusion chromatography. ABH-derivatized MβC molecules present on the surface of dispersed SWCNT structures are now available for reaction, via the unreacted hydrazide group of the ABH molecule, with aldehyde groups at a second reactive site to form hydrazone bonds. The second reactive sites may be disposed, e.g., on structural matrix compounds such as polymeric dialdehydes, polyvinylpyrrolidone-formaldehyde homopolymers and vinyl acetal polymers or a large number of graft copolymers that have aldehyde-containing side chains. This reaction scheme occurs in an aqueous environment, with azidophenyl photolysis occurring at a pH of about 7.4 and hydrazone bonds forming at a pH of about 5.5. In other words, the reaction occurs under conditions that are easily achieved in aqueous dispersions of SWCNT material. This reaction scheme is further useful for other dispersal agents other than cyclodextrins having methyl groups available for substitution with ABH molecules under the conditions described above.

An example of producing ABH-derivatized cyclodextrin coated SWCNT structures is provided as follows. MβC-dispersed SWCNT material that has been purified by size exclusion chromatography (5000 dalton molecular weight cut-off) and collected by centrifugation in a substantially similar manner as described above is resuspended in borate buffer (pH 7.4) containing 1 mM ABH at a final concentration of 200 micrograms/ml in a dark environment. The reaction mixture is incubated at about 37° C. for 1 hour in the dark with constant agitation followed by exposure to light (wavelength of about 265–275 nm) for a period of about 10–20 seconds to induce coupling of the ABH molecule to the methyl groups present on the MβC molecule via an azidophenyl reaction. The reaction mixture is then diluted using 10 volumes of water. Any unreacted ABH is then removed from the ABH-derivatized, MβC-dispersed SWCNT material by size exclusion column chromatography (5000 dalton molecular weight cut-off) using water as the eluting buffer, with the derivatized SWCNT material eluting in the column void volume. The ABH-derivatized, MβC-dispersed SWCNT material is then collected by centrifugation in preparation of reaction of the aldehyde-reactive hydrazide group of the ABH molecule now attached to the surface of the dispersed SWCNT structures. This material is resuspended in sodium acetate buffer (pH 5.5) at a concentration of 200 micrograms of ABH-derivatized SWCNT material/ml of buffer and reacted with a water-soluble aldehyde-containing graft co-polymer or applied to a solid structural substrate containing exposed aldehyde groups in order to form hydrazone bonds between exposed the aldehyde groups and the reactive hydrazide groups of the ABH molecule now attached to the surface of the dispersed SWCNT structures.

If a polymerized sheath of dispersal agent on individual SWCNT structures is desired, a compound containing two aldehyde groups that has a small sphere of coupling (e.g., naphthalene-2,3-dicarboxaldehyde) can be utilized at reduced SWCNT concentrations to couple adjacent dispersal agent molecules coated on the same SWCNT structure rather than two neighboring SWCNT structures. For example, by reducing the concentration of the dispersed SWCNT structures to a concentration of below 0.1 microgram of ABH-derivatized, MβC-dispersed SWCNT material in a borate buffer (pH 6.5) containing 0.01 M naphthalene-2,3-dicarboxaldehyde, cross-linking of two ABH-derivatized, MβC molecules located beside one another on the surface of a single SWCNT structure with dialdehyde is kinetically favored over a cross-linking reaction between ABH-derivatized, MβC molecules present on the surface of spatially separated SWCNT structures.

Other types of reactive groups suitable for spatially aligning SWCNT structures in accordance with the present invention are molecular recognition groups, such as antigen/antibody pairs. One example of a useful antigen/antibody group is the biotin/avidin pair. Biotin is a small protein typically utilized for labeling biological compounds in order to localize the labeled compound by virtue of the fact that biotin has a highly specific interaction with avidin. Biotin can also be easily cross-linked to certain dispersal agents, in effect "biotinylating" those dispersal agents. By binding biotin to a dispersal agent, e.g., cyclodextrin molecules, the functionally biotinylated dispersal agent can be used to manipulate individual SWCNT structures coated with that dispersal agent by providing selectively aligned reactive sites containing avidin molecules. Other antigen/antibody recognition systems typically utilized in derivatizing biological compounds are also capable of physically manipulating SWCNT structures coated with a derivatized dispersal agent.

A wide variety of commercially available and water-soluble biotinylation compounds are available and are useful in derivatizing dispersal agents. Some exemplary biotinylation compounds include, without limitation, Biotin-PEO-Amine (reactive with carboxyl groups), PEO-Iodoacetyl-Biotin (reactive with thiol groups) and Sulfo-NHS-Biotin (reactive with primary amines). These compounds as well as others are commercially available from Pierce Chemical Company (Rockford, Ill.), along with standard reaction protocols (including operating conditions, suitable concentrations and buffers, etc.). Depending upon the dispersal agent and biotiylation compound to be used for a particular situation, the dispersal agent may need to initially be derivatized with an appropriate reactive group in order to bind with the biotinylation compound. Alternatively, a more direct approach to effect biotinylation of the SWCNT structures is to first link the biotin molecule to a reactive group of a heterobifunctional cross-linking agent (e.g., the maleimide group of PMPI, or the hydrazide group of ABH), and then react the derivatized biotin molecule with dispersed SWCNT structures coated with dispersal agent. In producing biotinylated SWCNT structures, it is also important to allow biotin molecules to react with avidin molecules without steric hindrance from either the dispersal agent or the surface curvature of the SWCNT structure. Biotinylation agents such as Biotin-PEO-Amine and PEO-Iodoacetyl-Biotin have elongated spacer arms between the biotin molecule and the reactive group, thereby serving to spatially locate the biotin molecule a suitable distance from the surface of the compound to which it is attached and prevent steric hindrance.

An example of biotinylating cyclodextrin coated SWCNT structures is described as follows. MβC-dispersed SWCNT material that has been derivatized with PMPI (e.g., as described above) is resuspended at a concentration of 200 mg/ml of PMPI-derivatized SWCNT material in a borate buffer (pH 8.5) containing 5% (w/v) biocytin. At a pH above 7.5, the maleimide group present on the PMPI loses its specificity for thiol groups and also becomes reactive towards amine groups. The biotin containing molecule, biocytin (e-N-[d-biotinyl]-L-lysine) is a biotin derivative consisting of a biotin molecule attached to a lysine molecule.

Biocytin remains highly reactive to avidin and is typically used in biological applications for biotinylating proteins. In this case, the maleimide group of the PMPI reacts with the amine group present on the biocytin molecule. Thus, the biocytin molecule covalently attaches to the PMPI-derivatived MβC compounds coated on the surface of the dispersed SWCNT structures to effectively biotinylate the dispersed SWCNT structures. After incubation with constant agitation at room temperature, unreacted biocytin is removed from the SWCNT reaction mixture by diluting the sample with 10 volumes of water followed by size exclusion column chromatography (5000 dalton molecular weight cut-off) using water as the eluting buffer, with the derivatized SWCNT material eluting in the column void volume. An alternative approach to biotinylating dispersed SWCNT structures is to utilize the biotin-containing Biotin-PEO-Amine reagent instead of biocytin. This water-soluble reagent contains a primary amine group separate from a biotin group by a polyethylene oxide (PEO) spacer arm. Again, the same previously described reaction schemes can be utilized to bind Biotin-PEO-Amine groups to PMPI-derivatized MβC-dispersed SWCNT structures, where the Biotin-PEO-Amine reagent is utilized at a concentration of 5 mg/ml in borate buffer (pH 8.5).

Another antigen/antibody pairing group that may be utilized to "tag" the dispersed SWCNT structures and spatially orient those structures in a desired manner is the combination of 6xHis/anti-6xHis pair. His tags are synthetically produced polypeptides made exclusively from histidine amino-acids. The 6xHis antigen tags are easily attached to SWCNT structures via a water-soluble heterobifunctional cross-linker that reacts and binds with a carboxyl group present on the 6xHis tag. An exemplary cross-linker for binding a 6xHis tag to, e.g., an MβC coated SWCNT structure, is ABH. An appropriate spacer arm may be inserted between reactive sites on the 6xHis tags to reduce steric hindrance problems associated with reactions occurring with anti-6xHis tag monoclonal antibodies that recognize the 6xHis tags. Other exemplary antigen/antibody pairs that could be utilized here are the use of hapten molecules (e.g., digoxigenin or dinitrophenyl) and monoclonal antibodies that recognize the specific hapten to be utilized. The hapten molecules may be connected to the SWCNT structures in a similar manner as the previous antigen/antibody pairs, i.e., via an appropriate cross-linking agent having a reactive group that binds with a reactive group on the hapten molecule. A wide variety of other commercially available antigen/antibody combinations are also useful here, where the selection of a particular combination can be determined by the ease of coupling the antigen tags to the dispersal agent employed in a particular circumstance. Specific examples of commercially available antigen/antibody combinations, along with standard reaction protocols (including operating conditions, suitable concentrations and buffers, etc.), are available from Molecular Probes (Eugene, Oreg.).

Physical Alignment of SWCNT Material in Selected Configurations

The chemical binding techniques described above are very useful in aligning SWCNT structures to form a matrix or array of selectively aligned and cross-linked SWCNT material. Alignment of SWCNT structures in selected spatial orientations may also be achieved without derivatizing the dispersal agent coating SWCNT structures to provide a suitable reactive group on the dispersal agent. In the techniques described below, SWCNT structures dispersed in aqueous solution are deposited onto a substrate having channels etched on its surface, where the channels effect a physical orientation of SWCNT material along the path of the channels. A variety of useful products may be manufactured from SWCNT structures utilizing these physical alignment techniques, including, without limitation, flat screen displays, electronic circuit components, thermal management materials and linearized SWCNT structures for use in the spinning of fibers. The manufacture of electronic circuit components with aligned SWCNT structures is particularly useful, in that the dimensions of the circuit component may be reduced several orders of magnitude in comparison to conventionally manufactured circuit components.

Dispersions of individual SWCNT structures coated with dispersal agents in aqueous solution are generally random and non-aligned in solution. SWCNT structures will align and form crystalline material, referred to as tapes or rafts, upon removal of aqueous solvent (i.e., water) from the dispersed SWCNT structures. Specifically, upon removal of water by controlled evaporation or by rapid filtration across a membrane, dispersed SWCNT structures coated with dispersal agent form raft-like or tape-like structures of individual and separated nanotubes. The SWCNT tapes or rafts that are formed as a result of such water removal have been physically characterized by atomic force microscopy (AFM) as being thousands of microns long and made up of aligned individual SWCNT structures that are generally greater than about 20 microns in length. The aligned nature of these crystalline SWCNT structures makes the structures very desirable for use in such applications as thermal management materials or field emitters. However, the crystalline SWCNT structures must be further aligned on a much larger scale in order to render the structures useful for electronic and materials applications.

Selective alignment of crystalline SWCNT material can be achieved by utilizing microchannels etched in a suitable substrate, such as glass, silicon or plastic. The substrate is preferably a physical form or mould in which to concentrate dispersed SWCNT structures so that they form crystalline structures in an aligned configuration within the substrate channels. The channels may be etched on the substrate in any selected pattern or configuration and have dimensions selected so as to produce crystalline SWCNT material corresponding with the channel pattern or configuration and channel dimensions. Channels may be formed on a substrate surface on a micron level utilizing a photolithography etching technique. An exemplary channel etched in a substrate for receiving deposited SWCNT structures is depicted in FIGS. 5a–5d. The channel preferably has a generally V-shaped cross-section as depicted in FIG. 5a. When an aqueous solution containing dispersed SWCNT structures coated with dispersal agent is placed in this channel (FIG. 5b), the SWCNT structures become concentrated at the bottom of the V-shaped channel by a process of sedimentation (FIG. 5c). As the SWCNT structures sediment in combination with evaporation of the aqueous solvent, a crystalline SWCNT material forms and extends along the length of the channel. Alternatively, the dimensions of the V-shaped channel can be increased to the macro-scale level to receive a much larger volume of dispersed SWCNT material in aqueous solution, leading ultimately to the production of a larger crystalline product. In addition, the processing time associated with SWCNT sedimentation can be considerably reduced by centrifuging the solid substrate, e.g., in a swing bucket type centrifuge, where the direction of the centrifugal g-force applied to the channel is depicted by the arrow in FIG. 5b. The remaining solvent can then be evaporated in a controlled manner from the channel to induce the formation of SWCNT crystalline material. If desired, the dispersal agent may also be removed from the crystalline product disposed at the bottom of the channel by either low temperature heating in air or high temperature vacuum or annealing in an inert atmosphere to char the dispersal agent while leaving the aligned and crystalline SWCNT structures intact.

A complex spatial structure containing aligned SWCNT structures may be produced utilizing a plurality of V-shaped channels, with micron spacing between each channel, etched onto a substrate. Preferably, a flexible, non-electrically conductive plastic sheet is utilized as the substrate, with the channels etched into the substrate utilizing photolithographic techniques, preferably by a LIGA process. The plastic material utilized as the substrate may be polydimethylsiloxane, or PDMS, or any other suitable plastic material. The use of a LIGA process provides a much higher aspect ratio for the V-shaped channels than is capable from traditional photolithographic methods used on glass or silicon substrates. Additionally, in a LIGA process, the substrate to be etched may be manufactured with plastic polymers that can be incorporated with specific physical properties (such as hydrophobic or hydrophilic surface properties). The choice of implementing a particular photolithographic method will depend in large part upon the desired dimensions of the channels for depositing SWCNT material therein. In other words, the larger the volume and depth-to-width ratio of the channel, the greater thickness and increased number of layers of crystalline SWCNT material that can be formed within the channel. Exemplary channel dimensions capable of being formed utilizing a LIGA process are in the range of about 1,000 to about 10,000 microns in depth and between about 1 to 10 microns in width.

Figure 6A:
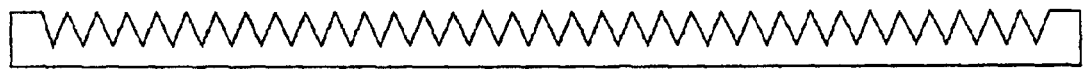
Figure 6B:
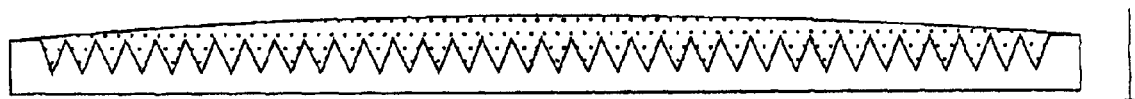
Figure 6C:
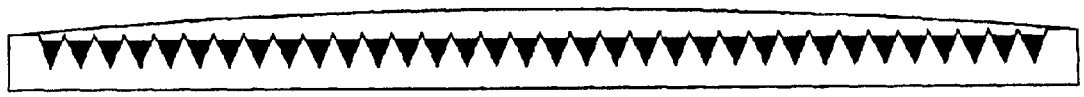
Figure 7:
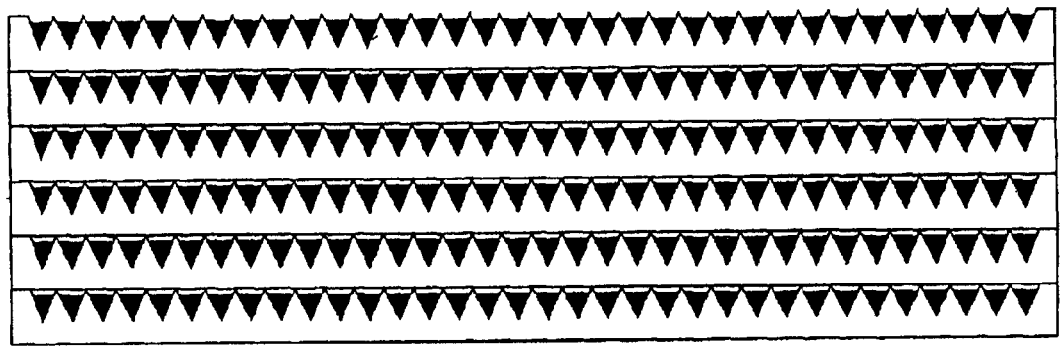

An exemplary embodiment of a structure manufactured from an aligned array of SWCNT material is illustrated in FIGS. 6a–6c. Specifically, a sheet of channeled plastic, depicted in FIG. 6a, contains a plurality of V-shaped channels on its surface. An aqueous solution of dispersed SWCNT material is deposited onto the surface of the sheet (FIG. 6b) and the sheet is centrifuged, e.g., in a swing-bucket centrifuge, so that the g-vector (depicted by the arrow in FIG. 6b) concentrates the dispersed SWCNT structures in the base of the V-shaped channels. After centrifugation, the sheet is removed from the centrifuge, and the remaining solvent is removed by controlled evaporation to yield crystalline SWCNT material within the channels (FIG. 6c). The sheet is then laminated together with a multitude of other similar sheets containing crystalline SWCNT material to form a brick of material, as depicted in FIG. 7. The brick contains aligned SWCNT material embedded in a single direction along the channels of each sheet. Thin, flexible sheets may be cut from the brick of material in a direction perpendicular to the direction in which the V-shaped channels (and the crystalline SWCNT material disposed therein) are aligned. One side of a flexible sheet is painted with a metallic paint to form an electrical connector pad with the crystalline SWCNT material present in the thin flexible layer of plastic substrate. The aligned and crystalline SWCNT material formed in this aligned manner are useful for a number of applications, such as field emitter arrays for flat display panels.

Under certain conditions, the substrate may be removed leaving the crystalline SWCNT material intact. For example, SWCNT structures coated with derivatized and cross-linked dispersal agent molecules will remain in crystalline form after removal of the substrate from around those structures. Plastic substrates, such as PDMS and polycarbonate may be removed by solvent extraction utilizing acetone or other suitable solvents, leaving long "fibers" of crystalline SWCNT material that may be utilized for a variety of applications, such as in spinning continuous lengths of spun SWCNT fibers for materials.

Physical Alignment Combined with Chemical Attraction or Binding Techniques

Deposition of dispersed SWCNT structures into channels of a substrate to physically align those structures along the channels may be enhanced by chemical attraction or binding of the dispersal agent coating the SWCNT structures within the channels. The SWCNT structures may be physically drawn within the etched channels in a variety of ways. For example, the substrate channels may be hydrophilic to attract the hydrophilic exposed portions of the dispersal agent coating the SWCNT structures. Alternatively, reactive sites may be immobilized within the channels to attract SWCNT structures coated with dispersal agent molecules derivatized with reactive groups having an affinity for binding with the reactive sites disposed within the channels.

A substrate that provides suitable chemical attracting properties can be manufactured utilizing a series of layered materials having different chemical properties. Channels are etched within an outer surface layer of the substrate utilizing an E-beam or atomic force microscopy (AFM) etching technique. The etched channels expose an inner surface layer having different chemical properties than the outer surface layer and that attract SWCNT structures coated with dispersal agent molecules into the channels. Thus, providing a chemically attractive surface within the channels for the dispersal agent coated SWCNT structures enables a specific and accurate spatial placement of SWCNT structures within those channels and allows for the production of useful electronic components such as circuits, resistors, capacitors, etc. The size of the SWCNT structures further allows for the electronic components to be manufactured on the nanometer dimensional scale.

An exemplary embodiment of forming a circuit component of aligned SWCNT material within substrate channels is illustrated in FIGS. 8a–8c and 9. SWCNT structures dispersed within aqueous solution are coated with MβC molecules and deposited within the channels of the substrate. The surfaces of the substrate channels are provided with a hydrophilic surface to attract the MβC coated SWCNT structures within the channels. A hydrophobic overlay surface is further deposited over the channels to repel the SWCNT structures from the outer substrate surface and assist in manipulating the SWCNT structures into the channels.

Figure 8A:
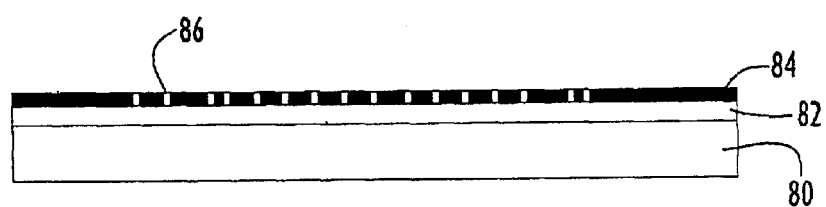
Figure 8B:
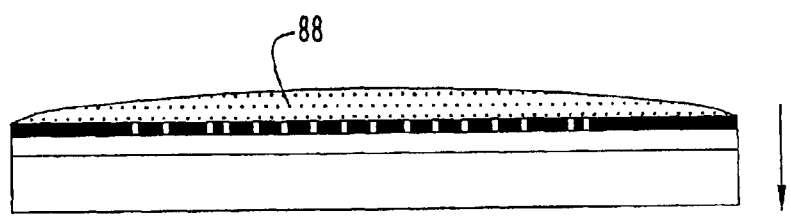
Figure 8C:
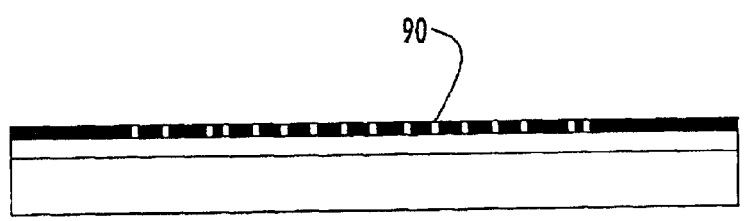
Figure 9:
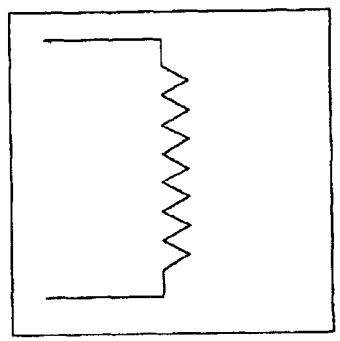

The substrate is prepared by providing a first layer 80 of silicon treated with ozone to produce a hydrophilic underlay 82 of silicon oxide on the silicon layer surface. A hydrophobic self-assembling monolayer (SAM) 84, such as hexyltrimethoxysilane or trimethyl silyl iodide, is then formed on underlay 82 and bonds to the silicon oxide layer via Si—O—Si bonds. A uniform layer of SAM compound (i.e., one molecule in thickness) can be applied to the silicon oxide layer of an ozone-treated silicon substrate after washing of the surface with ethanol and then distilled water, followed by drying with compressed filtered air while the silicon substrate is rotating in a spin coater at 5000 rpm. A hydrophobic SAM compound, for example, hexyltrimethoxysilane, can be applied to the cleaned silicon oxide layer by spin coating at 5000 rpm and then dried with compressed filtered air. Utilizing E-beam or AFM etching, a specific electronic circuit pattern is etched into the SAM layer, physically removing the SAM molecules in the etched area (depicted generally at 86 in FIG. 8a). Removal of the hydrophobic SAM molecules exposes the hydrophilic underlay of silicon oxide in the etched pattern. An aqueous solution 88 containing dispersed cyclodextrin-coated SWCNT structures is then deposited onto the SAM surface layer 84 as depicted in FIG. 8*b*. The exposed hydrophilic underlay areas attract and capture dispersed cyclodextrin-coated SWCNT structures within the solution. In order to enhance potential contact between the dispersed SWCNT structures and the exposed hydrophilic underlay, the SWCNT dispersion is centrifuged down onto the patterned underlay surface (e.g., utilizing a swing-out bucket centrifuge), where the g-vector direction is indicated by the arrow in FIG. 8*b*. After centrifugation has sufficiently settled SWCNT material within the bottom surface of the channels, remaining unattached SWCNT structures are washed off the substrate, leaving the cyclodextrin coated SWCNT structures 90 immobilized in the hydrophilic regions of etched pattern as indicated in FIG. 8*c*. The aqueous solution may be removed by evaporation or any of the other methods previously described to leave highly aligned SWCNT material within the channels. The substrate illustrated in FIG. 9 provides one example of a circuit component (i.e., a resistor) that may be formed with SWCNT material in accordance with this technique.

Other useful substrates that provide both hydrophilic channel surfaces and hydrophobic overlay surfaces may employ polymers instead of silicon for the substrate underlay. Exemplary hydrophilic underlay surfaces include, without limitation, PDMS, polycarbonate, polyamides and plastic graft copolymers based upon polyethylene or polystyrene chemistries specifically designed to contain hydroxyl surface groups or other surface groups that can be converted to hydroxyl groups by specific chemical treatments (e.g., reacting surface ester groups with $LiAlH_a$ to produce surface hydroxyl groups, hydroboration-oxidation of surface vinyl groups into surface hydroxyl groups or converting surface bromide groups into surface hydroxyl groups using silver chemistry). These polymers have advantageous properties in addition to being hydrophilic, such as being non-electrically conductive and flexible. These compounds can further be utilized directly as a hydrophilic solid support or, alternatively, can be applied (e.g., by spin coating of the material dissolved in an organic solvent such as acetone) to an inert solid substrate as a uniform hydrophilic layer. The polymer underlay can then be coated with a hydrophobic SAM or a thin uniform layer of hydrophobic polymerized polymer, and the same patterning process (e.g., either E-beam etching or AFM etching) may be utilized to remove the hydrophobic layer from the hydrophilic underlay in a specific pattern. In addition to centrifugation, other environmental controls (e.g., controlling temperature or pH of the SWCNT dispersion), can be provided to enhance the hydrophilic interaction between the dispersal agent coating SWCNT structures and the hydrophilic surface of the pattern, while enhancing the hydrophobic repulsive forces between the dispersal agent and the hydrophobic overlay.

In yet another embodiment, a solid substrate is prepared in a substantially similar manner as described above utilizing a first layer (e.g., glass, silicon or plastic) coated with a biological capture underlay (e.g., avidin) that has been covalently attached to the support surface. Covalent attachment of a biological capture underlay to the first layer is accomplished using a suitable heterobifunctional cross-linking agent. For example, avidin contains both primary amines and carboxyl groups, and, as noted above, a wide range of known and commercially available cross-linking agents can be utilized that are reactive to at least one of those two reactive groups. A suitable cross-linking agent attaches avidin to the support surface of the first layer, where the reactive group of the cross-linking agent not reactive to avidin is reactive to a functional group present on the support surface. For example, a support surface having hydroxyl groups disposed thereon (either constituitively or as a consequence of a chemical treatment) can be reacted under aqueous conditions at a pH of about 8.5 with the heterobifunctional cross-linking agent PMPI to produce a surface reactive to thiol groups at a pH below about 7.5. However, above a pH of about 7.5, the maleimide reactive group of PMPI is also reactive to amines, thus allowing avidin to be covalently attached to the support surface when applied to the PMPI-derivatized surface in an aqueous buffer at a pH of about 7.5. In another example, the succinimidyl ester of 6-((acryloyl)amino)hexanoid acid can be reacted with avidin to produce acrylamides that can be copolymerized into a polyacrylamide matrix and subsequently applied as a substantially uniform layer to the support surface by spin coating.

Examples of specific avidin compounds commercially available and useful for being polymerized as a uniform layer on a substrate are streptavidin agarose and strepavidin acrylamide, each of which are provided as a lyophilized solid powder. A third exemplary compound that has the advantage of reducing non-specific interactions is CaptAvidin™ Biotin acrylamide, a form of avidin in which the tyrosine residues are nitrated and the avidin-biotin interaction is pH sensitive. CaptAvidin™ Biotin acrylamide can be polymerized using bis-acrylamide as the cross-linking compound (at a 30:1 ratio of CaptAvidin™ Biotin acrylamide to bis-acrylamide) and TEMED/ammonium persulphate as a catalyst. The mixture is prepared in a 0.5M Tris buffer (pH 6.5), degassed for 10 minutes after which time the catalyst (i.e. TEMED) and ammonium persulphate (i.e. oxygen scavenger) is added to the acrylamide mixture and quickly mixed. This mixture is then applied to an ethanol-cleaned solid substrate, such as a silicon wafer or glass slide, rotating in a spin coater at 5000 rpm. The substrate is removed and the avidin-acrylamide matrix layer is allowed to polymerize at room temperature for about 1 hour in a dark environment.

Upon formation of a suitable avidin underlay to the surface of the first layer, a hydrophobic overlay (e.g., a hydrophobic SAM or uniform layer of hydrophobic polymer) is then applied to the underlay by spin coating of the hydrophobic SAM compound directly on top of the avidin-acrylamide matrix. Using either E-beam or AFM processing techniques, a specific pattern is etched into the overlay surface, thereby exposing the underlay surface. An aqueous dispersion of SWCNT structures coated with dispersal agent is biotinylated in a substantially similar manner as described above to attract and bind the SWCNT structures to the avidin coated channel surfaces. The biotinylated SWCNT structures in solution are deposited on to the patterned surface and the substrate is centrifuged (e.g., in a swing bucket centrifuge) to enhance the probability of contact between the SWCNT structures and the capture sites present within the substrate channels. The specificity of the avidin-biotin recognition reaction within the substrate channels can be further enhanced by using aqueous buffers that contain high levels of calcium and magnesium ions, and/or low levels of surfactants such as 0.01% (w/v) Tween 20, to prevent binding of biotin to the hydrophobic overlay. The remaining aqueous solution is removed from the patterned surface leaving aligned SWCNT structures immobilized in a selected spatial pattern on the substrate.

Similar reaction schemes utilizing heterobifunctional cross-linking agents or polyacrylamide matrices can be employed to accomplish the attachment of other specific monoclonal antibodies to produce a biological capture underlay reactive to other "tag" antigen molecules attached to dispersed SWCNT structures. Additionally, it is noted that any of the other reaction schemes described above may also be utilized to attract and bind SWCNT structures within substrate channels, where the SWCNT structures are coated with dispersal agent molecules derivatized with suitable reactive groups and the substrate contains suitable reactive sites immobilized within the channels.

In a further embodiment, a pattern of reactive sites is formed on a substrate surface without the use of etching techniques to expose a reactive underlay by removing portions of an inert or repulsive overlay. Basically, the surface of a substrate is functionalized in a selected pattern with a reactive sites, followed by immobilization of SWCNT structures along the selected pattern by binding of reactive groups connected to the SWCNT structures to those reactive sites. The reactive groups utilized may be any of the previously described reactive groups, including molecular recognition groups such as antigen/antibody pairs.

An exemplary chemical compound that is useful for providing a reactive site on the substrate is a fluorinated aryl azide. The fluorinated aryl azide, 4-azido-2,3,5,6-tetrafluorobenzoic acid, has been used in biological applications to photochemically functionalize the surface of polymer support surfaces in order to trap biomolecules on the polymer surface. In those applications, an amine-reactive derivative of 4-azido-2,3,5,6-tetrafluorobenzoic acid is covalently inserted into the C—H bonds of a polymer structure via a nitrene reaction at an illumination below about 350 nm, leaving a succinimidyl ester projecting from the polymer surface. The succinimidyl ester, which is reactive to amines, provides a suitable binding site for biomolecules containing amine groups.

This reaction scheme is modified here to make use of the photoreactive groups of the tetrafluorobenzoic acid derivative in order to generate a desired spatial pattern of binding sites on a substrate. Specifically, a water-soluble amine reactive STP ester of 4-azido-2,3,5,6-tetrafluorobenzoic acid is covalently reacted with a solid support surface containing amine groups (e.g., an aminated silicon wafer or glass wafer spin coated with a uniform layer of polyacrylamide containing amine residues) to bind a plurality of the tetrafluorobenzoic acid derivative molecules to the substrate surface. The surface is subsequently exposed to UV photolithography to induce the formation of aryl nitrenes (i.e., reactive sites) in specific spatial patterns.

An example of preparing such a substrate with a pattern of reactive sites is described as follows. A commercially available amine-containing acrylamide, such as CaptAvidin™ Biotin acrylamide, is polymerized using bis-acrylamide as the cross-linking compound at a 30:1 ratio of CaptAvidin™ Biotin acrylamide to bis-acrylamide and using TEMED/ammonium persulphate as a catalyst. The mixture is prepared in a 0.5M Tris buffer (pH 6.5) and degassed for 10 minutes, after which time the TEMED (i.e., the catalyst) and ammonium persulphate (i.e., the oxygen scavenger) is added to the acrylamide mixture and quickly mixed. This mixture is then applied to an ethanol-cleaned solid substrate, such as a silicon wafer or glass slide, rotating in a spin coater at 5000 rpm. The substrate is removed and the amine-containing acrylamide matrix layer is allowed to polymerize at room temperature for 1 hour in a dark environment. Borate buffer (pH 7.5) containing 10 mM 4-azido-2,3,5,6-tetrafluorobenzoic acid is then applied to the amine-containing matrix and reacted at room temperature for about 4 hours in the dark to allow coupling of the 4-azido-2,3,5,6-tetrafluorobenzoic acid with the amine groups located on the surface of the amine-quenched by washing excess 4-azido-2,3,5,6-tetrafluorobenzoic acid from the surface using water. The 4-azido-2,3,5,6-tetrafluorobenzoic acid-treated substrate is now ready to be used as a substrate utilizing standard photolithographic techniques for producing electronic circuits, with the exception that the light source used is a 350 nm UV laser light source. Instead of the production of an acid-resistant mask layer as in standard silicon photolithographic techniques, a surface pattern consisting of reactive aryl nitrenes are produced on the surface of the 4-azido-2,3,5,6-tetrafluorobenzoic acid-treated substrate by UV exposure. An aqueous solution of dispersed SWCNT structures coated with dispersal agent molecules containing C—H bonds (e.g., cyclodextrin molecules) is then deposited on the surface to allow the reactive aryl nitrenes of the UV-exposed surface areas to react with those C—H bonds and immobilize SWCNT structures along the selected spatial patterns. In order to ensure efficient contact between the reactive aryl nitrene groups produced by UV photolithography and the dispersal agent-coated SWCNT's in solution, the SWCNT solution is centrifuged down onto the substrate surface or the solvent (i.e., water) is removed by controlled evaporation. After reaction of the reactive aryl nitrene groups with the C—H bonds located on the surface of the dispersed SWCNT's for a period of about 4 hours at room temperature, unattached SWCNT's are removed by washing with water, leaving SWCNT's spatially localized in those areas of the solid substrate that had been exposed to UV light.

Other photoreactive compounds can also be utilized in practicing the invention to produce reactive groups in specific patterns on a substrate upon photoactivation by photolithography, thus producing a reactive pattern on the substrate surface to spatially localize SWCNT structures with reactive groups that bind to the reactive pattern.

The novel methods and structures described above, for aligning SWCNT structures into selected spatial orientations utilizing one or a combination of chemical binding and physical aligning techniques, are useful for easily manipulating SWCNT structures in any configuration for a variety of commercial and experimental uses. Rapid prototyping of products formed from aligning SWCNT structures is also achieved by the present invention.

Having described novel methods and structures for spatially localizing single walled carbon nanotubes into useful structure and corresponding products thereof, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed:

1. A method of spatially aligning a single walled carbon nanotube in a selected orientation comprising:
    adhering a dispersal agent to the nanotube, the dispersal agent being selected from the group consisting of octyl-phenoxypolyethoxyethanol, deoxycholates, taurocholic acid, cyclodextrins, chaotropic salts, polyoxyethylene sorbitol esters, poloxamers, sapogenin glycosides, and combinations thereof;
    securing a reactive group to the dispersal agent adhered to the nanotube; and
    binding the reactive group to a reactive site secured to a structure to connect the nanotube with the structure.

2. The method of claim 1, wherein the reactive group is connected to a base compound, the base compound includes a second reactive group spaced a selected distance from the reactive group, and the securing the reactive group to the dispersal agent includes:

binding the second reactive group to a second reactive site disposed on the dispersal agent.

3. The method of claim 1, wherein at least one of the reactive group and the reactive site includes a chemical group selected from the group consisting of alkyl, carboxyl, amine, sulfhydryl, hydroxyl, aldehyde, maleimide, isocyanate and hydrazide.

4. The method of claim 1, wherein at least one of the reactive group and the reactive site is disposed on one of a homobifunctional cross-linking agent and a heterobifunctional cross-linking agent.

5. The method of claim 4, wherein the cross-linking agent is selected from the group consisting of a dithiol, PMPI and ABH.

6. The method of claim 1, wherein each of the reactive group and the reactive site includes one of an antigen and an antibody.

7. The method of claim 6, wherein the reactive group includes biotin and the reactive site includes avidin.

8. The method of claim 7, wherein the reactive group is disposed on a biotinylation compound selected from the group consisting of biocytin, Biotin-PEO-Amine, PEO-Iodoacetyl-Biotin and Sulfo-NHS-Biotin.

9. The method of claim 1, wherein the structure to which the reactive site is secured is another single walled carbon nanotube.

10. The method of claim 1, wherein the structure to which the reactive site is secured is a substrate.

11. The method of claim 1, wherein the dispersal agent is at least one of taurocholic acid and a cyclodextrin.

12. A method of modifying single walled carbon nanotubes comprising:

adhering a dispersal agent to a single walled carbon nanotube, wherein the dispersal agent is effective in dispersing the nanotube from other nanotubes in an aqueous solution and is selected from the group consisting of octyl-phenoxypolyethoxyethanol, deoxycholates, taurocholic acid, cyclodextrins, chaotropic salts, polyoxyethylene sorbitol esters, poloxamers, sapogenin glycosides, and combinations thereof; and securing to the dispersal agent a chemical compound comprising a reactive group, wherein the reactive group is capable of binding with a reactive site secured to a structure upon exposure of the reactive group to the reactive site.

13. The method of claim 12, further comprising:

providing a plurality of single walled carbon nanotubes dispersed in aqueous solution with the dispersal agent adhered to the nanotubes, wherein each nanotube includes at least one reactive group secured thereto via the dispersal agent.

14. The method of claim 12, wherein the reactive group includes a chemical group selected from the group consisting of alkyl, carboxyl, amine, sulfhydryl, hydroxyl, aldehyde, isocyanate, maleimide and hydrazide.

15. The method of claim 12, wherein the chemical compound is selected from the group consisting of a dithiol, PMPI and ABH.

16. The method of claim 12, wherein reactive group comprises one of an antigen and an antibody.

17. The method of claim 16, wherein the reactive group includes biotin.

18. The method of claim 17, wherein the chemical compound is selected from the group consisting of biocytin, Biotin-PEO-Amine, PEO-Iodoacetyl-Biotin and Sulfo-NHS-Biotin.

19. The method of claim 12, wherein the dispersal agent is at least one of taurocholic acid and a cyclodextrin.

20. A method of forming a structure of spatially oriented single walled carbon nanotubes comprising:

coating the nanotubes with dispersal agent molecules to disperse the nanotubes from each other in an aqueous solution, the dispersal agent molecules being selected from the group consisting of octyl-phenoxypolyethoxyethanol, deoxycholates, taurocholic acid, cyclodextrins, chaotropic salts, polyoxyethylene sorbitol esters, poloxamers, sapogenin glycosides, and combinations thereof;

securing reactive groups to the dispersal agent molecules; and securing the nanotubes coated with dispersal agent molecules including reactive groups secured thereto to spatially oriented reactive sites secured to at least one structure via a binding reaction between the reactive sites and the reactive groups.

21. The method of claim 20, wherein each of the reactive groups and the reactive sites includes a chemical group selected from the group consisting of alkyl, carboxyl, amine, sulfhydryl, hydroxyl, aldehyde, isocyanate, maleimide and hydrazide.

22. The method of claim 20, wherein the reactive groups are disposed on cross-linking agents, and the securing a plurality of reactive groups to the dispersal agents molecules includes:

securing the cross-linking agents to the dispersal agent molecules.

23. The method of claim 22, wherein each cross-linking agent is selected from the group consisting of PMPI, ABH and a dithiol.

24. The method of claim 22, wherein each of the reactive groups and the reactive sites comprises one of an antigen and an antibody.

25. The method of claim 24, wherein each of the reactive groups include biotin, and each of the reactive sites include avidin.

26. The method of claim 25, wherein each cross-linking agent is a biotinylating agent selected from the group consisting of biocytin, Biotin-PEO-Amine, PEO-Iodoacetyl-Biotin and Sulfo-NHS-Biotin.

27. The method of claim 20, wherein the at least one structure includes dispersal agent molecules coating the nanotubes, and the securing the nanotubes coated with dispersal agent molecules including reactive groups secured thereto to spatially oriented reactive sites secured to at least one structure includes securing each nanotube to a neighboring nanotube to form a matrix of interconnected nanotubes.

28. The method of claim 20, wherein the at least one structure is a substrate, the reactive sites are secured on a surface of the substrate in a selected spatial pattern, and the securing the nanotubes coated with dispersal agent molecules including reactive groups secured thereto to spatially oriented reactive sites secured to at least one structure includes aligning the nanotubes along the selected spatial pattern.

29. The method of claim 28, wherein the substrate includes at least one channel disposed on the substrate surface, and the reactive sites are disposed within the at least one channel.

30. The method of claim 20, wherein the at least one structure is a substrate, and the securing the nanotubes coated with dispersal agent molecules including reactive groups secured thereto to spatially oriented reactive sites secured to at least one structure includes:

coating the surface of the substrate with a plurality of photoreactive molecules including the reactive sites, wherein the reactive sites are photoactivated and become reactive with the reactive groups upon exposure to ultraviolet light; and subjecting the coated surface of the substrate to a selected pattern of ultraviolet light to photoactivate the reactive sites disposed along the selected pattern.

31. The method of claim 30, wherein the photoreactive molecules are derivatives of 4-azido-2,3,5,6-tetrafluorobenzoic acid.

32. The method of claim 20, wherein the dispersal agent is at least one of taurocholic acid and a cyclodextrin.

33. A method of forming a structure of selectively oriented single walled carbon nanotubes, comprising:

forming at least one channel on a substrate; and depositing single walled carbon nanotubes into the at least one channel to form aligned nanotube material along the at least one channel;

wherein the nanotubes are coated with dispersal agent molecules to disperse the nanotubes in an aqueous solution, and the dispersal agent molecules are selected from the group consisting of octylphenoxypolyethoxyethanol, deoxycholates, taurocholic acid, cyclodextrins, chaotropic salts, polyoxyethylene sorbitol esters, poloxamers, sapogenin glycosides, and combinations thereof.

34. The method of claim 33, wherein the depositing the single walled carbon nanotubes into the channel includes:

depositing the nanotubes coated with the dispersal agent molecules and dispersed in aqueous solution into the at least one channel;

sedimenting the nanotubes in the solution within the at least one channel; and removing the solution from the at least one channel to form the aligned nanotube material along the channel.

35. The method of claim 34, wherein the removing the solution from the at least one channel includes at least one of evaporating the solution and controlled heating of the solution, and the aligned nanotube material formed along the at least one channel is crystalline.

36. The method of claim 34, wherein the dispersal agent molecules include a hydrophobic region that adheres to the nanotubes and an exposed hydrophilic region, and the forming at least one channel on a substrate includes:

providing an underlay including a hydrophilic surface to attract the nanotubes coated with the dispersal agent molecules;

providing an overlay over the underlay to cover the hydrophilic surface; and etching the overlay to form the at least one channel on the overlay, wherein the underlay is exposed within the at least one channel.

37. The method of claim 36, wherein the overlay includes an exposed hydrophobic surface to repel nanotubes coated with the dispersal agent molecules from the hydrophobic surface.

38. The method of claim 34, wherein each of the dispersal agent molecules includes a reactive group secured thereto, and the at least one channel includes a plurality of reactive sites immobilized along the at least one channel, and the depositing the nanotubes coated with the dispersal agent molecules and dispersed in aqueous solution includes:

binding the reactive groups to the reactive sites to immobilize the nanotubes within the channels at the reactive sites.

39. The method of claim 33, further comprising:

providing a plurality of substrates with a plurality of channels containing aligned nanotube material formed within each of the channels, wherein the channels on each substrate are longitudinally aligned in a similar direction;

adhering the substrates to each other in a stacked relationship to form a brick including a matrix of channels longitudinally aligned in a similar direction;

sectioning the brick in a direction transverse a longitudinal axis of each of the channels to form a plurality of blocks containing the matrix of channels of reduced longitudinal dimensions; and coating a surface of each of the blocks that is transverse the longitudinal axis of each of the channels with an electrically conductive material.

40. The method of claim 33, wherein a plurality of channels are formed on the substrate and aligned in a pattern of a circuit component, and the aligned nanotube material formed along the channels forms the circuit component.

41. The method of claim 33, further comprising:

removing the single walled carbon nanotube material aligned within the channels from the substrate to form fibers of single walled carbon nanotube material.

42. The method of claim 41, wherein the removing the single walled carbon nanotube material aligned within the channels from the substrate includes dissolving the substrate from the aligned single walled carbon nanotube material.

43. The method of claim 33, wherein each of the channels includes a substantially V-shaped cross-section.

44. The method of claim 33, wherein the dispersal agent is at least one of taurocholic acid and a cyclodextrin.

* * * * *